No. 686,370.  
A. E. VOLKERSEN.  
BRICK MOLDING AND PRESSING MACHINE.  
(Application filed Aug. 16, 1901.)  
(No Model.)
Patented Nov. 12, 1901.
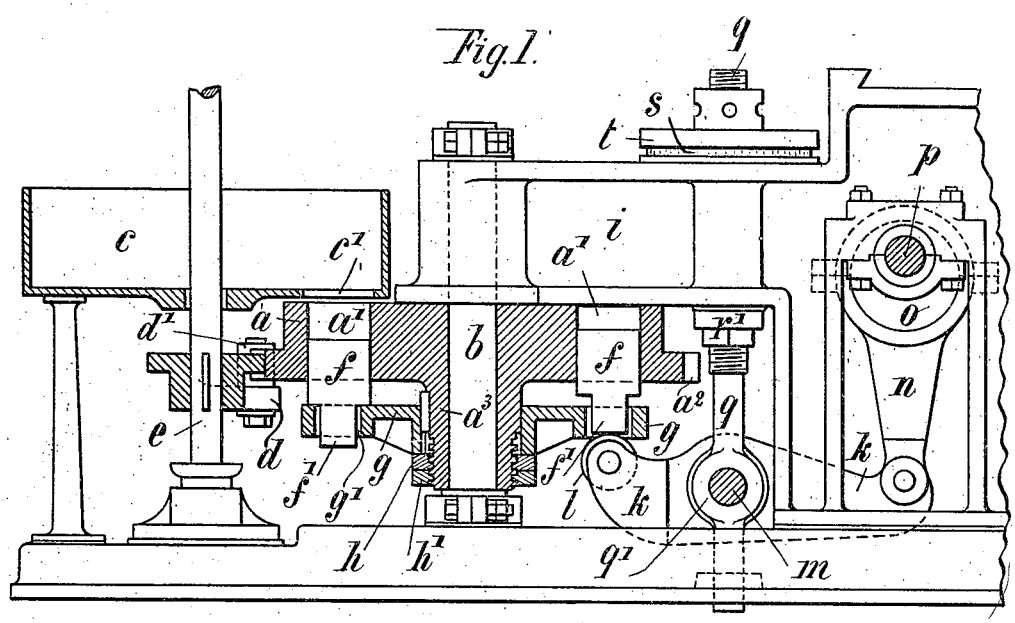
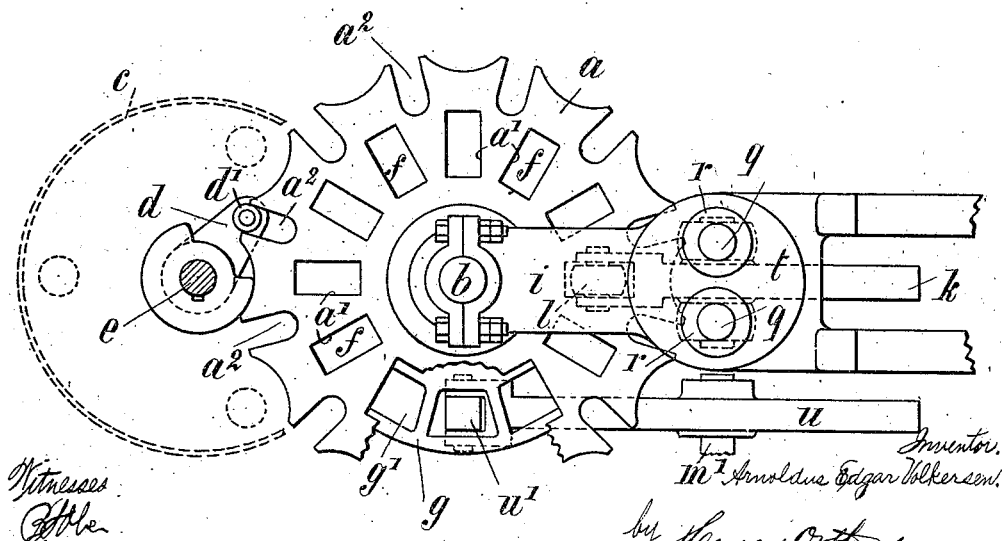

UNITED STATES PATENT OFFICE.

ARNOLDUS EDGAR VOLKERSEN, OF HAMBURG, GERMANY, ASSIGNOR TO THE FIRM OF AMANDUS KAHL, OF HAMBURG, GERMANY.

BRICK MOLDING AND PRESSING MACHINE.

SPECIFICATION forming part of Letters Patent No. 686,370, dated November 12, 1901.

Application filed August 16, 1901. Serial No. 72,260. (No model.)

*To all whom it may concern:*

Be it known that I, ARNOLDUS EDGAR VOLKERSEN, a subject of the German Emperor, and a resident of Hamburg, in the German Empire, have invented certain new and useful Improvements in Brick Molding and Pressing Machines, of which the following is a specification.

The present invention relates to improvements in brick molding and pressing machines, the object being to provide a brickmaking machine in which the guiding and supporting disk for the movable pistons forming the bottoms of the molds in the mold-table is capable of being adjusted in height with relation to the intermittently-rotating mold-table in order to vary the height or depth, respectively, of the molds in which the said pistons work, so that bricks or blocks of various thicknesses can be pressed by the same machine.

With this end in view my invention consists in certain novel features of construction and combinations of parts, as will be hereinafter fully described with reference to the accompanying sheet of drawings, in which—

Figures 1 and 2 represent in vertical section and plan, respectively, so much of my improved brick molding and pressing machine as is necessary to illustrate my invention.

Similar letters refer to similar parts throughout both views.

The mold table or disk $a$, containing the molds $a'$, (of which there may be any desired number,) is mounted on a stationary vertical shaft $b$ and arranged to rotate intermittently beneath a suitable feed hopper or casing $c$ to bring each mold $a'$ in succession beneath the discharge-passage $c'$ in the bottom of the said feed-casing from which the clay or other material is forced or allowed to drop into the molds.

Intermittent rotary motion may be imparted to the mold-table $a\ a'$ by means of a crank-arm $d$, mounted on a separate shaft $e$, the crank-pin $d'$ of which engages in radial slots or guides $a^2$, formed in the periphery of the mold-table and arranged the same angular distance apart from one another as the molds $a'$, the arrangement being such that when the crank-pin is at the mouth of one of the said radial slots the center lines of this slot and the next adjacent slot are tangents to the circle described by the crank-pin or its center line, respectively. By the above transmitting means a smooth or gentle intermittent rotary motion is imparted to the mold-table, so that all sudden shocks which are so commonly experienced in connection with the mechanisms hitherto in use and whereby the molding operation of the bricks is disadvantageously affected are reliably obviated.

The bottom of each mold $a'$ is formed by a piston or plunger $f$, having a stem $f'$ on its lower side. The pistons $f$ are carried by a supporting table or disk $g$, provided near its periphery with holes or perforations $g'$, into which the stems $f'$ are inserted, so that the pistons rest upon the upper surface of the supporting-table $g$, while the stems passing through the holes $g'$ project from the lower side of the pistons to beneath the lower surface of the supporting-table. The latter is slidably but not rotatably mounted on the hub $a^3$ of the mold-table $a$ and may be adjusted in height with relation to the mold-table and secured in the desired position by means of a nut $h$ and lock-nut $h'$, screwed upon an external screw-thread of the hub $a^3$, as this is obvious from Fig. 1. By raising or lowering the supporting-table $g$ the pistons $f$ will also be raised or lowered and the depth or height of the molds $a'$ reduced or increased accordingly, so that bricks or blocks of various thicknesses can be pressed by the same machine.

At one side of the machine the framework of the latter is arranged to form a stationary pressing-head $i$. Below and opposite to the pressing-head $i$ is arranged a pressing-lever $k$ in such a manner that its friction-roller $l$, carried by the free end of this lever, is beneath the stem of the pistons, thereby enabling the mold-table, supporting-table, and pistons to be rotated between the pressing-head and the pressing-lever. The latter is pivotally mounted on a shaft $m$ and may be oscillated or rocked at the proper time by means of an eccentric-rod $n$, actuated by a suitable cam or eccentric $o$ on the driving-shaft $p$, mounted in suitable bearings of the machine-frame. The shaft $m$ is suspended in suitable bearings $q'$ of adjustable suspension-rods $q$. The latter are passed through guide openings or channels in the pressing-head and may be adjusted in height and secured in the proper position by means of nuts $r\ r'$, screwed on external threads of the said suspension-rods. By means of the adjustable suspension-rods the pressure exerted by the pressing-lever may be easily controlled. For absorbing shocks and the like a washer $s$ of yielding material may be placed between the pressing-head $i$ and the top plate $t$, forming the bearing-surface for the nuts $r$.

For removing the compressed bricks out of the molds a suitable ejecting-lever $u$ may be mounted on a shaft $m'$. This ejecting-lever $u$, carrying at its front end a suitable pusher $u'$, destined to act from below against the stem of the pistons, may be operated from the driving-shaft $p$ in a similar manner as the pressing-lever $k$. The eccentric and eccentric-rod for actuating the ejecting-lever are, however, not especially shown in the drawings.

The operation of the brick-making machine is as follows: After the supporting-table $g$ has been properly adjusted by means of the nuts $h\ h'$ the shaft $e$ is set in motion in order to intermittently rotate the mold-table $a$ and to bring each mold $a'$ in succession beneath the discharge-opening $c'$ of the hopper $c$. Each mold as it comes into position to be charged with clay, &c., from the casing $c$ has its piston $f$ lowered. The filled mold on its further travel passes between the pressing-head and the pressing-lever, which latter is then rocked and caused to lift or raise the piston and to thereby compress the contents of the mold to form a brick or block of the required thickness. This position of parts is represented in Fig. 1. After the compression has been performed the pressing-lever rocks down, thereby allowing the freed piston to drop down and rest again upon the supporting-table. The next movement or movements of partial rotation, as the arrangement may be, bring the mold containing the compressed or finished brick right over the ejecting-lever, which then by its rocking movement lifts the piston flush with the upper surface of the mold-table, so that the brick or block resting on the said piston may be readily taken off or removed therefrom. After the removal of the brick or block the ejecting-lever rocking in opposite direction allows the piston to drop down again onto the supporting-table, whereupon the mold-table continues its intermittent rotation.

Having fully described my invention, what I claim, and desire to secure by Letters Patent, is—

1. In a brick-making machine, the combination with a table containing the molds, of a supporting-table connected thereto, pistons forming the bottoms of said molds and supported by said supporting-table, means for actuating the pistons and means for adjusting said supporting-table relative to the mold-table to vary the depth of the mold and thereby the thickness of the bricks formed, substantially as and for the purpose set forth.

2. In a brick-molding machine, the combination with a rotating table containing the molds and a head against which the bricks are pressed, of a supporting-table secured to and rotatable with the mold-table, pistons forming the bottoms of said molds and supported in the supporting-table, means for adjusting the relation of said supporting-table to the mold-table, means for intermittently revolving the tables and devices to operate said pistons, substantially as and for the purpose set forth.

3. In a brick-making machine, the combination with a rotating table containing the molds and provided with radial slots, of a stationary head below which the mold-table is rotated, of a driven crank arm and pin, said pin taking into the slots to intermittently rotate the table, a supporting-table rotatable with the mold-table, pistons supported therein to form the bottoms of the molds, a lever pivoted to move the pistons against the stationary head, means for adjusting the supporting-table relative to the mold-table and means for adjusting the position of the lever relative to the ends of the pistons, substantially as and for the purpose set forth.

4. In a brick-making machine, the combination with a stationary head, a revolving table provided with a hub and containing the molds, of a supporting-table secured to the hub of said table, means for adjusting the latter table relative to the former, pistons forming the bottoms of the molds, supported in the supporting-table and having their ends projecting beneath it, a lever for actuating the pistons to press the material against the head and a second lever to actuate the pistons to eject the brick after being pressed, substantially as and for the purpose set forth.

ARNOLDUS EDGAR VOLKERSEN.

Witnesses:
   ED. ADOLF STANGENBERGER,
   JOHN W. MCCALL.